United States Patent [19]

Knopf

[11] 4,340,497
[45] Jul. 20, 1982

[54] (N-SUBSTITUTED CARBAMOYLOXY) ALKANOYLOXYALKYL ACRYLATE ESTERS

[75] Inventor: Robert J. Knopf, Saint Albans, W. Va.

[73] Assignee: Union Carbide Corporation, Danbury, Conn.

[21] Appl. No.: 132,650

[22] Filed: Mar. 21, 1980

[51] Int. Cl.³ .............. C07C 125/065; C07C 125/073
[52] U.S. Cl. .......................... 252/188.3 R; 260/465.4; 560/24; 560/26; 560/115; 560/158; 560/166
[58] Field of Search ................... 252/188.3 R; 560/24, 560/26, 115, 158, 166; 260/465.4

[56] References Cited

U.S. PATENT DOCUMENTS

| Re. 30,772 | 10/1981 | Friedlander et al. | 560/24 |
|---|---|---|---|
| 3,479,328 | 10/1969 | Nordstrom | 560/166 |
| 3,674,838 | 7/1972 | Nordstrom | 560/166 |
| 4,279,833 | 7/1981 | Culbertson et al. | 560/115 |

Primary Examiner—Irwin Gluck
Attorney, Agent, or Firm—Francis M. Fazio

[57] ABSTRACT (N-Substituted carbamoyloxy) alkanoyloxyalkyl acrylate esters produced by reacting an hydroxyalkyl acrylate with a lactone monomer and capping the resulting adduct with an isocyanate. The resulting product is useful in ink, paint or adhesive formulations curable by thermal or radiation means.

17 Claims, No Drawings

(N-SUBSTITUTED CARBAMOYLOXY) ALKANOYLOXYALKYL ACRYLATE ESTERS

BACKGROUND OF THE INVENTION

Compounds such as 2-(N-methyl carbamoyloxy) ethyl acrylate are well known with the generic class disclosed in U.S. Pat. No. 3,479,328, and U.S. Pat. No. 3,674,838. These compounds have been found particularly effective in radiation curable compositions since they impart desirable properties to the prepared compositions and to the cured compositions. However, due to their sensitizing effect and toxicity they must be handled with extreme caution and, as a consequence, these features detract from their general acceptance and use.

SUMMARY OF THE INVENTION

The novel (N-substituted carbamoyloxy)alkanoyloxyalkyl acrylate esters of this invention are those defined by the structural formula:

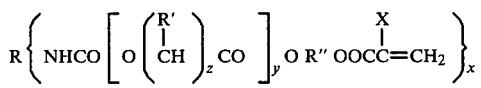

wherein R is an unsubstituted or substituted (i) linear or branched alkyl group having from 1 to 4 carbon atoms, or (ii) aryl, alkaryl or aralkyl group having 6 or 10 ring carbon atoms, or (iii) cycloalkyl group having from 5 to 8 ring carbon atoms when x is 1, and polyvalent alkylene, arylene, alkarylene or cycloalkylene having carbon atom values defined for (i) to (iii) supra and a valence equal to the value of x when x is greater than 1; wherein the substituents on the R group are not reactive with the isocyanato radical; R' is hydrogen or alkyl or alkoxy having from 1 to 4 carbon atoms; R" is a linear or branched divalent alkylene of 1 to 10 carbon atoms, preferably 2 to 4 carbon atoms, divalent cycloalkylene of 5 to 12 carbon atoms, preferably 6 to 8 carbon atoms, or divalent arylene of 6 to 10 ring carbon atoms; X is hydrogen, methyl or cyano; x has a value of from 1 to 4; y is an integer having an average value of from 1 to 20, preferably from 1 to 6 and most preferably from 1 to 4; and z is an integer having a value of from 3 to 10, preferably from 5 to 6.

DESCRIPTION OF THE INVENTION

The novel componds of this invention are produced, preferably, by a two-step process that can, if desired, be carried out sequentially in the same reactor. The compounds have monofunctionality when a monoisocyanate is used in the second step of the reaction and polyfunctionality when a polyisocyanate is used. The polyfunctional acrylyl compounds can be used as crosslinkers in formulated compositions.

In the first step of the reaction a hydroxyalkyl acrylate of the general formula:

wherein X and R" are as previously defined, is reacted with a lactone of the general formula:

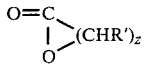

wherein R' and z are as previously defined, to produce the adduct.

Illustrative of suitable hydroxyalkyl acrylates or methacrylates or cyanoacrylates one can mention hydroxyethyl acrylate, hydroxyethyl methacrylate, hydroxyethyl cyanoacrylate, hydroxypropyl acrylate, hydroxybutyl acrylate, hydroxybutyl methacrylate, hydroxydecyl acrylate, hydroxydecyl cyanoacrylate, hydroxycyclohexyl acrylate, hydroxycyclohexyl methacrylate, hydroxycyclooctyl acrylate, and the like. Those skilled in the art are fully familiar with this class of compounds and mixtures can be used.

Illustrative of suitable lactones one can mention butyrolactone, epsilon-caprolactone, zeta-enantholactone, delta-valerolactone; the alkyl-delta valerolactones such as the methyl-, ethyl-, hexyl-, dimethyl-delta-valerolactones; the alkyl epsilon-caprolactones such as the methyl-, ethyl-, hexyl-, dimethyl-, diethyl-, di-n-propyl-, di-n-hexyl-, di-iso-propyl-, trimethyl-, triethyl-, tri-n-propyl-epsilon-caprolactones, and the like. The lactones are known to those skilled in the art and mixtures can be used.

The reaction between the hydroxyalkyl acrylates and lactone is preferably carried out in contact with a catalyst. The Lewis Acids are suitable as catalyts and illustrative thereof one can mention boron trifluoride etherate, stannic chloride, zinc chloride, magnesium perchlorate, bis (trifluoroethyl sulfonyl) tin, and the like. The catalyst is present in a catalytically effective amount; this can be from 0.1 to 1 weight percent, based on the total weight of reactants charged, preferably from 0.2 to 0.5 weight percent, with from 0.25 to 0.35 weight percent most preferred.

In the reaction from 1 to about 80 moles, or more; preferably from 1 to 24 moses, of lactone are reacted per mole of hydroxyalkyl acrylate. The amount used is that required to give the desired y value in formula I; as previously indicated the preferred y value is from 1 to 6 and the most preferred value is from 1 to 4.

The reaction can be carried out at atmospheric or superatmospheric pressure, pressure is not critical though modest pressure can develop in a sealed reactor. The reaction time will vary dependent upon the particular reactants, catalysts, temperature, and batch size involved in any paticular instance.

The reaction temperature will vary from about 20° C. to about 125° C. and is generally from about 25° C. to about 80° C., preferably from about 55° C. to 75° C.

To minimize olefinic bond free radical polymerization an inhibitor such as the monoethyl ether of hydroquinone is added at a concentration of from about 0.01 to 0.1 weight percent. Any of the other known inhibitors can be used.

In carrying out the first step reaction of the lactone with the hydroxyalkyl acrylate one can charge the hydroxyalkyl acrylate and catalyst to a reactor equipped with stirring, condensing and cooling means and then heat the contents to the selected temperature within the range heretofore stated. When this charge is at the desired reaction temperature the lactone feed is started and cooling is supplied as required to maintain the desired temperature during the exothermic feed period.

When an exotherm is no longer observed, heating is continued for an additional period of one to three hours at the selected reaction temperature after feed of lactone has been terminated. The resulting adduct can be used in this form in the second step of the reaction, or it can be treated and the semi-refined or refined adduct can then be used in the second step of the reaction.

Any conventional refining procedure can be used when the adduct is desired in a purer state. Thus, following the additional heating period the residual adduct can be neutralized with a base or a diatomaceous earth material such as magnesium silicate, stirred, heated at reduced pressure to remove volatiles, and then filtered to remove solid residues. Other procedures can be used that are apparent to those skilled in the art.

In the second step of the reaction the adduct whose preparation was described above is reacted with an organic isocyanate. The suitable isocyanates can be mono-, di-, tri- or tetra-isocyanates and many such compounds are known and are commercially available. They can be used singly or in admixture and illustrative thereof one can mention methyl isocyanate, ethyl isocyanate, chloroethyl isocyanate, chlorobutoxypropyl isocyanate, hexyl isocyanate, phenyl isocyanate, the o-, m-, and p-chlorophenyl isocyanates, benzyl isocyanate, naphthyl isocyanate, p-ethylphenyl isocyanate, the dichlorophenyl isocyanates, methyl isocyanate, butyl isocyanate, n-propyl isocyanate, octadecyl isocyanate, 3,5,5-trimethyl-1-isocyanato-3-isocyanatomethylcyclohexane, di(2-isocyanatoethyl)-bicyclo (2.2.1)-hept-5-ene-2,3-dicarboxylate, 2,4-tolylene diisocyanate, 2,6-tolylene diisocyanate, 4,4'-diphenylmethane diisocyanate, dianisidine, diisocyanate, tollidine diisocyanate, hexamethylene diisocyanate, the m- and p-xylylene diisocyanate, tetramethylene diisocyanate, dicyclohexyl-4,4'-methane diisocyanate, cyclohexane-1,4-diisocyanate, 1,5-naphthylene diisocyanate, 4,4'-diisocyanate diphenyl ether, 2,4,6-triisocyanate toluene, 4,4',4"-triisocyanatotriphenyl methane, diphenylene-4,4'-diisocyanate, the polymethylene polyphenylisocyanates, as well as any of the other organic isocyanates known to the average skilled chemist.

It is customary to use any of the known urethane-forming reaction catalysts during the isocyanate reaction with the polyol. These are well known and any of the catalysts can be used. Illustrative thereof are dibutyltin dilaurate, stannous octoate, triethylenediamine, triethylamine, the known salt catalysts, and the like. The catalysts are generaly employed at a concentration of from about 0.1 to 1 weight percent based on the weight of the reaction mixture.

The amount of isocyanate used is an amount to provide sufficient isocyanato equivalents to react with the reactive hydroxyl equivalents on the adduct. It is customary to use a slight excess to assure complete reaction. As previously indicated when a monoisocyanate is employed the novel N-(substituted carbamoyloxy)alkanoyloxyalkyl (or aryl) acrylate ester of formula I is monofunctional in respect to acrylyl functionality and when a polyisocyanate is used such formula I ester is polyfunctional in respect to acrylyl functionality. The term "acrylyl" includes acrylyl, methacrylyl and cyanoacrylyl groups.

The second step of the reaction is generally carried out by slowly adding the isocyanate to the adduct obtained in the first step of the reaction at a temperature of from 20° to 90° C., preferably from about 25° to 75° C., and most preferably from about 40° to 55° C. During this addition the mixture is stirred; thereafter stirring is continued at the selected reaction temperature for a short period of time to assure completion of reaction. The residual product is then vacuum stripped to remove volatiles and, if necessary, filtered to remove any trace quantities of solid particles. The N-(substituted carbamoyloxy)alkanoyloxyalkyl acrylate ester produced corresponding to formula I can be used per se or in formulated compositions.

In producing formulated compositions the novel compounds of this invention are compounded with activators or catalysts, photoinitiators or photosensitizers, pigments or colorants, solvents, other reactive components, etc. The formulators skilled in the art of inks, coatings and adhesives are fully familiar with the requirements in their respective fields and the components used. Such components can be formulated with the novel compounds of this invention by the known and conventional procedures and in the accepted concentrations.

Thus, when cure is to be accomplished by thermal means a conventional free radical catalyst or activator is used; when the cure is to be achieved by particulate radiation such as electron beam radiation, an activator is usually not required; when cure is to be effected by light radiation such as ultraviolet light, a photosensitizer or photoinitiator, with optionally an activator therefor, is needed to render the cure process commercially acceptable. Coating, ink or adhesive compositions can contain from 1 to 100 weight percent, preferably from 5 to 75 weight percent and most preferably from 5 to 50 weight percent of the novel compounds of this invention as the reactive component thereof. The specific identities of the other components referred to in this and the preceding paragraph are well known to those skilled in the art and require no further elaboration herein to enable such person to produce the formulations.

The following examples serve to further illustrate the invention.

EXAMPLE 1

Step 1—Production of Hydroxyethyl Acrylate: epsilon-Caprolactone Adduct

A rector was charged with 241.6 g of hydroxyethyl acrylate and 2 g of boron trifluoride etherate and the contents were heated to 65° C. Over a 20-minute period 456 g of epsilon-caprolactone were added; during the addition the mixture was stirred and cooled to maintain a temperature of 55° to 60° C. After all of the lactone had been added the mixture was stirred at 69° to 72° C. for one hour. Fourteen grams of magnesium silicate was added and stirring continued for 2 hours at 90° C. The liquid was filtered hot and 652 g of the adduct was recovered. A repeat run had an hydroxyl number of 128 mg KOH/g, a viscosity of 282 cks at 38° C. and a color of 4.5 Gradner Units. On standing several days both became slushy mixtures.

Step 2—Production of (N-Methylcarbamoyloxy)(di-hexanoyloxy)ethyl acrylate

To the 652 g adduct of Step 1 there was added 0.5 g of dibutyltin dilaurate and the temperature was adjusted to 45° C. Over a 30 minute period 106 grams of methyl isocyanate were added at 45° to 48° C. After addition was complete the mixture was stirred for 3 hours at 45° to 48° C., and then stripped of volatiles for one hour at 3 to 5 mm. Hg pressure. There was obtained 738 grams of liquid (Monomer I) having a color of 3.5 Gardner Units and the average formula:

$$CH_3NHCO(OC_5H_{10}CO)_2OC_2H_4OOCCH=CH_2$$

The repeat run referred to in Step 1 was reacted in the same manner and produced a liquid (Monomer II) product having a viscosity of 652 cks at 38° (measured after standing one month at room temperatue) and a color of 5 Gardner Units. On further standing at room temperature both became slushy.

Reaction of the adduct of Step 1 with tolylene diisocyanate produces a product having the average formula:

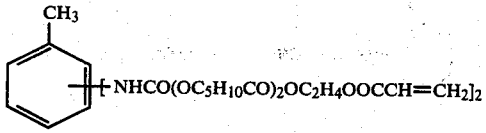

EXAMPLE 2

Step 1

In a manner similar to that described in Example 1, 483.2 g of 2-hydroxyethyl acrylate was reacted with 456 g of epsilon-caprolactone using 4 g of boron trifluoride etherate as catalyst. After neutralization and filtration there was recovered 917 g of liquid adduct, which remained liquid upon prolonged storage at ambient room temperature, having an hydroxyl number of 240 mg KOH/g, a viscosity of 35.3 cks at 38° C. and a color of 3.5 Gardner Units; its average formula was:

$$HOC_5H_{10}COOC_2H_4OOCH=CH_2$$

In a similar manner the adduct is produced using 2-hydroxypropyl methacrylate or 4-hydroxycyclohexyl acrylate in place of the 2-hydroxyethyl acrylate.

Step 2

In a manner similar to that described in Example 1, 458 g of the adduct shown above was reacted with 113.9 g of methyl isocyanate at 45° to 50° C. using 0.35 g of dibutyltin dilaurate catalyst. After stripping in vacuo there was recovered 559 g of liquid (Monomer III) having a viscosity of 72 cks at 38° C., a color of 4 Gardner Units and the average formula:

$$CH_3NHCOOC_5H_{10}COOC_2H_4OOCCH=CH_2.$$

EXAMPLE 3

Step 1

In a manner similar to that described in Example 1, 241.6 g of 2-hydroxyethyl acrylate was reacted with 912 g of epsilon-caprolactone at 60° to 70° C. using 2 g of boron trifluoride etherate. After neutralization with magnesium silicate there was recovered 1,120 g of a slushy adduct having an hydroxyl number of 105, a viscosity of 316 cks at 38° C., a color of 4 Gardner Units and an average of four —(OC$_5$H$_{10}$CO)— units.

In a similar manner the adduct is produced using 2-hydroxypropyl acrylate in place of the 2-hydroxyethyl acrylate.

Step 2

In a manner similar to that described in Example 1, 560 g of the adduct produced above was reacted with 55.3 g of methyl isocyanate at 45° to 50° C. using 0.4 g of dibutyltin dilaurate catalyst. After stripping in vacuo there was obtained a liquid (Monomer IV) having a viscosity of 450 cks at 38° c., a color of 4.5 Gardner Units and an average formula of:

$$CH_3NHCO(OC_5H_{10}CO)_4OC_2H_4OOCCH=CH_2$$

Upon prolonged standing at ambient room temperature it became slushy.

Monomers I to IV were evaluated as components in radiation curable coating compositions and comparred to compositions that did not contain these reactive monomers but contained an equal weight amount of known reactive monomers, namely 2-ethylhexyl acrylate (2-EHA) and (N-methylcarbamoyloxy)ethyl acrylate (MCEA). The radiation curable compositions were produced containing 30 weight percent of Monomer I to IV, 2-EHA or MCEA as a reactive diluent monomer and 70 weight percent of a reactive oligomer (Oligomer A) produced in the reactive diluent monomer. Oligomer A was the reaction product of a poly-epsilon-caprolactone diol having an average molecular weight of 530, isophorone diisocyanate and 2-hydroxyethyl acrylate.

A radiation curable composition was produced by charging 125 g of isophorone diisocyanate, 150 g of Monomer II as diluent and 0.4 g of dibutyltin dilaurate to a reactor and heating the mixture of 40° C. Over a 15 minute period 153 g of poly-epsilon-caprolactone (Av. M.W. 530) was added followed by 69 g of 2-hydroxyethyl acrylate over a similar period. The mixture was then stirred overnight at 42° C. to complete the reaction. There was obtained a 30/70 by weight mixture of Monomer II and the oligomer produced by the reaction of the polycaprolactone, isophorone diisocyanate and 2-hydroxyethyl acrylate to which was added one weight percent of di(secbutoxy)acetophenone photoinitiator (Coating II).

In a similar manner, coating compositions were produced with Monomers I, III and IV of the above examples as the diluents and compared with two control compositions in which the diluents used were heretofore available reactive compounds, namely 2-EHA and MCEA. Quantities reacted were the same as those recited above.

The individual coating compositions were evaluated by application to a steel plate using a wire-wound rod and curing by exposure to ultraviolet light radiation in a nitrogen-inerted system. The cured films were from 3 to 5 mils thick and their properties were determined using an Instron Tensile Tester in accord with ASTM-D-638.

The production and evaluation details of the clear films produced are shown in Table I.

TABLE I

| Reactive Monomer Charged | Coating Produced | Tensile Strength psi | Elongation % |
| --- | --- | --- | --- |
| I | I | 1600 | 69 |
| II | II | 1700 | 68 |
| III | III | 1700 | 66 |
| IV | IV | 920 | 56 |
| 2-EHA | Control A | 260 | 33 |

TABLE I-continued

| Reactive Monomer Charged | Coating Produced | Tensile Strength psi | Elongation % |
|---|---|---|---|
| MCEA | Control B | 3300 | 44 |

The results show that Coatings I to IV, containing Monomers I to IV, exhibit, on an overall balance of properties tested, improved properties over Control A. Further, the monomers of this invention and compositions containing them showed lower volatility and less odor than were observed with 2-EHA and MCEA.

What is claimed is:

1. An (N-substituted carbamoyloxy) alkanoyloxyhydrocarbyl acrylate ester of the formula

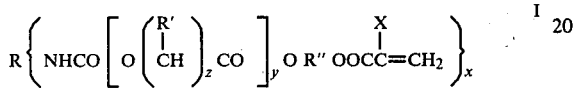

wherein R is an unsubstituted or substituted (i) linear or branched alkyl group having from 1 to 4 carbon atoms or (ii) aryl, alkaryl or aralkyl group having 6 or 10 ring carbon atoms or (ii) cycloalkyl group having from 5 to 8 ring carbon atoms when x is 1 and polyvalent alkylene, arylene, alkarylene, aralkylene or cycloalkylene having carbon atom values defined for (i) to (iii) supra and a valence equal to the value of x when x is greater than 1; wherein the substituents on the R group are not reactive with the isocyanato radical; R' is hydrogen or alkyl or alkoxy having from 1 to 4 carbon atoms; R" is a linear or branched divalent alkylene of 1 to 10 carbon atoms, divalent cycloalkylene of 5 to 12 ring carbon atoms or divalent arylene of 6 to 10 ring carbon atoms; X is hydrogen, methyl or cyano; x has a value of from 1 to 4; y has an average value of from 1 to 20; and z has a value of from 3 to 10.

2. A compound as claimed in claim 1, wherein R" is a linear or branched divalent alkylene of 2 to 4 carbon atoms, divalent cycloalkylene of 6 to 8 ring carbon atoms, or divalent arylene of 6 to 10 ring carbon atoms; y has an average value of from 1 to 6; and z has a value of from 5 to 6.

3. A compound as claimed is claim 1, wherein x is one and z is 5.

4. A compound as claimed in claim 1, wherein x is two and z is 5.

5. A compound as claimed in claim 1, wherein both R' and X are hydrogen.

6. A compound as claimed in claim 1 of the formula:

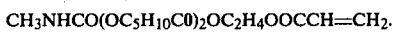

7. A compound as claimed in claim 1 of the formula:

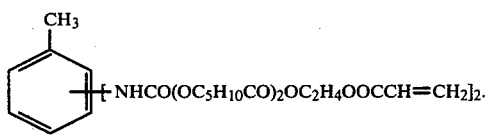

8. A compound as claimed in claim 1 of the formula:

9. A compound as claimed in claim 1 of the formula:

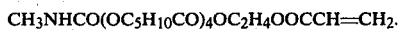

10. A composition comprising a compound as claimed in claim 1 and a photoinitiator.

11. A composition comprising a compound as claimed in claim 3 and a photoinitiator.

12. A composition comprising a compound as claimed in claim 4 and a photoinitiator.

13. A composition comprising a compound as claimed in claim 5 and a photoinitiator.

14. A composition comprising a compound as claimed in claim 6 and a photoinitiator.

15. A composition comprising a compound as claimed in claim 7 and a photoinitiator.

16. A composition comprising a compound as claimed in claim 8 and a photoinitiator.

17. A composition comprising a compound as claimed in claim 9 and a photoinitiator.

* * * * *